United States Patent Office 2,996,636
Patented Aug. 15, 1961

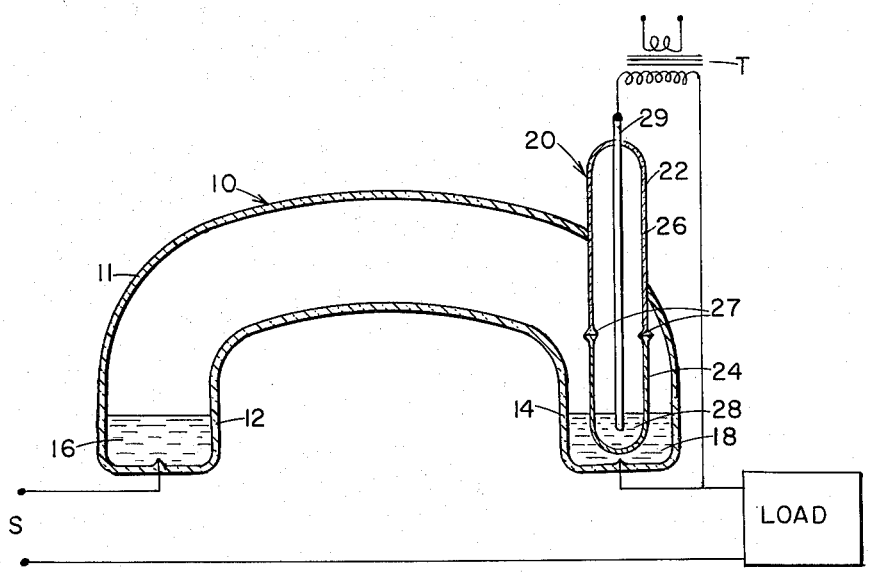
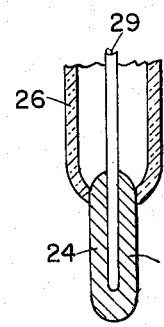
FIG.2
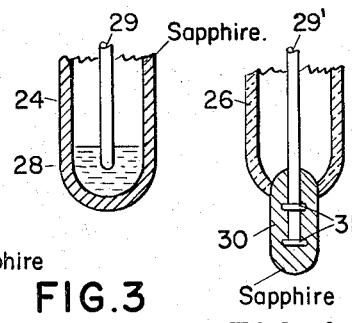
FIG.3
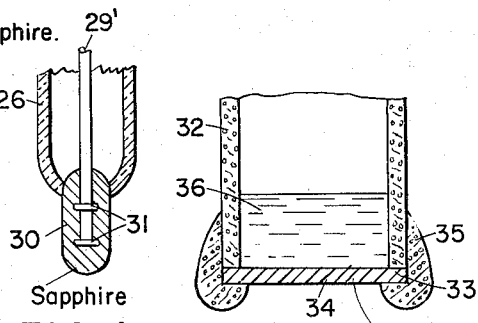
FIG.4
FIG.5

2,996,636
IGNITION MEANS FOR MERCURY ARC
DISCHARGE TUBE
Alfred Vang, Box 864, Rancho Santa Fe, Calif., assignor of one-third to Anna Vang and one-third to Alfred Vang as trustee
Filed Jan. 9, 1959, Ser. No. 785,827
7 Claims. (Cl. 313—171)

This invention relates to ignition means for mercury arc discharge tubes similar to those having starting "bands" as opposed to those having a starting electrode in electrical contact, or nearly so, with a mercury pool to be ignited.

Tubes having starting bands have often been referred to as being "externally fired" while those having the starting electrode in contact with the surface of the mercury pool have been known as "internally fired" tubes. As will become obvious from the description below, the terms "external" and "internal" lose their distinctive meaning as applied to inner and outer locations of the starting electrode with respect to the pool. The so-called "externally" or di-electrically fired tubes have the advantage over those "internally" or conductively fired in that the starting or triggering current can be nil and the mercury does not become contaminated by the presence of metal or carbon electrode material in direct contact with the mercury.

Heretofore, dielectrically fired tubes have lacked stability in that the dielectric material of the tube envelope, such as glass, would become pitted at the zones of the mercury and the starting band thereamound. In United States patent application Serial Number 636,935 filed January 29, 1957, now U.S. Patent No. 2,960,097 there was shown a construction utilizing a closed bottom dielectric igniter tube also containing mercury filled to about the same level of that of the pool and serving as the igniter electrode. This igniter tube at its lower end was of ceramic material high in alumina content, which withstood changes in characteristics better than glass under operating conditions. Material known as artificial sapphire was also used. We have since found that the nature of the ceramic material or sapphire is of startling importance especially when the discharge tube is to carry heavy currents.

We have found that in order for the dielectric material of the igniter to stand up under severe use, the dielectric material in the zone of the arc tube mercury pool, and particularly near the surface of the latter, must be substantially of monocrystalline material. If the dielectric contain cementing material holding many individual crystals of alumina or sapphire together, erosion takes place at the zones of the cementing material, so that the ignition characteristics are changed and eventually the tube becomes punctured. Also, some reduction of the alumina appears to take place and since this can take place only at the surface any loosing of soft cementing material exposes a greater area to reduction at the cathode spot.

Conversely, if the dielectric material is homogeneous, e.g. formed from a single crystal of sapphire, the igniter is very much more stable and resistant to breakdown.

Owing to the fact that substantially no current flows through the igniter dielectric, the igniter tube need not be large especially if the level of the cathode pool be kept constant.

An object of the invention is therefore to provide an improved dielectric igniter for mercury cathode pools.

Another object is to provide an improved dielectric member for separating an igniter electrode from a mercury pool.

And still another object is to provide a dielectric igniter that will be stable when used for ignition of cathode pools in arc-tubes carrying heavy currents.

In the accompanying drawing showing, by way of example, several of many possible embodiments of the invention, FIGURE 1 shows the igniter in connection with a conventional arc tube;

FIGURE 2 shows a detail of the lower end portion of the igniter of FIGURE 1, and FIGURES 3, 4 and 5 show modifications of the lower end of the igniter.

As shown in FIGURE 1 an arc-tube 10 comprises an envelope 11, say, of glass having two pocket portions 12 and 14 each containing mercury pools 16 and 18 the latter being the cathode. The arc tube is interconnected with a load and a source of current S which may be D.C. or A.C. depending on the nature of the load.

An igniter generally designated 20 passes through the envelope and dips into the cathode 18. The igniter comprises an igniter tube 22 of dielectric material closed at each end, the lower portion 24 of the tube 22 being of mono-crystalline material such as artificial sapphire, while for economy, the upper portion 26 may be of glass and welded to the lower portion as at 27. The weld 27 need only be out of the range of destructive temperature and can be to within a few mm. of the cathode level.

The starting electrode of the igniter is shown in the form of a small mercury pool 28 within the tube portion 24 connected to the exterior of the envelope by a metal, say, tungsten rod 29 passing through the upper end portion 26 and dipping into the pool 28. Ignition current or potential is applied to the two pools 18 and 28, for instance by a transformer T.

While the use of mercury as the igniter electrode is preferred in order to insure uniformity of contact the invention need not be so limited. For instance, the lower portion 24 may be of small diameter and the mercury omitted so that the rod 29 is itself the electrode. The rod then may be of more ductile metal.

By having the rod of ductile high melting metal, such as tungsten, we may even crystallize the dielectric material upon the end of the rod as in FIGURE 4 when the dielectric material may, after shaping if desired, be in the nature of a knob or sleeve 30 on the rod. Preferably, the rod as 29' should be provided with ridges 31 to hold the knob on the rod.

In yet another form as shown in FIGURE 5, the lower end portion of the igniter tube may be of non-homogeneous dielectric material as the cylinder 32 and of initially open bottom construction. A closure plate 34 of high purity mono-crystalline material is secured over the end 33 and held by a massive ring 35 of fusible dielectric material having a lower melting point than plate 34. The plate 34 may be a slice of natural or artificially prepared crystal, free from cementing material. If the cylinder 32 and retaining ring 35 be massive relative to the thickness of the plate both the ring and the cylinder may be subjected to much erosion without endangering the integrity and operating characteristics of the igniter tube as a whole, so long as a good fit with the plate is insured. The cylinder and ring may be of impure alumina or porcelain and even may be of glass provided it have about the same coefficient of expansion as the plate, although quartz may be used if the mercury is to be kept especially pure. The electrode 36 against the plate 34 may be liquid or solid, the latter being preferable so that the igniter may be inserted at an angle to the surface of the cathode.

As mono-crystalline material we prefer alumina or sapphire because of its high melting point and resistance to modification although other materials such as quartz, periclase and rutile may be used. These materials are chosen primarily because of comparative freedom from cementing material so that their properties remain constant. In general, impurities are not harmful so long as the impurities form crystals of the same lattice structure and spacing which do not undergo different rates of change with temperature.

So-called high alumina ceramics fail to stand up not because of impurities alone but because, in practice, the fluxing agents crystallize out in different forms from the individual crystals of the aluminum oxide. The low melting or soft cementing materials produced on cooling render the whole body of alumina tube honeycombed with destructible material. It is only a matter of time before current passing crevices develop.

The invention claimed is:

1. In a mercury arc tube, a mercury cathode and an ignition electrode therefor, and a mono-crystalline dielectric member separating the electrode and cathode.

2. In the combination as claimed in claim 1, said member being substantially free from crystal cementing material therein.

3. In the combination as claimed in claim 2, the member being of sapphire.

4. An igniter for a cathode of mercury comprising, a mercury ignition electrode and a container for the electrode of mono-crystalline dielectric material.

5. In a mercury arc-tube, a mercury cathode and ignition means for the cathode including conductive parts and a mono-crystalline partition in contact with the cathode for excluding the mercury of the cathode from said parts.

6. In a mercury arc-tube, a mercury cathode and an ignition electrode therefor, thick dielectric separation means for preventing contact between the electrode and cathode and substantially thick enough to withstand erosion during operation under heavy load and provided with an aperture through said means and a plate of mono-crystalline dielectric material thinner than said separation means in substantial contact with the cathode and electrode and covering the aperture, the dielectric material around the plate being thick enough to withstand breakdown under operating conditions to breakdown the same material when used in the thickness of said plate.

7. An igniter for a mercury cathode including a metal electrode having a lower end portion, and a dielectric covering on said portion and composed of mono-crystalline material free from cementing material.

References Cited in the file of this patent

UNITED STATES PATENTS

| | | |
|---|---|---|
| 2,078,671 | Knowles | Apr. 24, 1937 |
| 2,345,162 | Toepfer | Mar. 28, 1944 |
| 2,447,781 | Warmoltz | Aug. 24, 1948 |
| 2,473,232 | Warmoltz | June 14, 1949 |
| 2,541,842 | Teare | Feb. 13, 1951 |